(12) United States Patent
Kim (10) Patent No.: US 11,085,815 B2
(45) Date of Patent: Aug. 10, 2021

(54) FAULT DETECTING APPARATUS, GAS TURBINE, AND METHOD OF DETECTING FAULT

(71) Applicant: DOOSAN HEAVY INDUSTRIES & CONSTRUCTION CO., LTD., Changwon-si (KR)

(72) Inventor: Sangjo Kim, Gimhae-si (KR)

( * ) Notice: Subject to any disclaimer, the term of this patent is extended or adjusted under 35 U.S.C. 154(b) by 268 days.

(21) Appl. No.: 16/240,865

(22) Filed: Jan. 7, 2019

(65) Prior Publication Data
US 2019/0284955 A1 Sep. 19, 2019

(30) Foreign Application Priority Data
Mar. 14, 2018 (KR) .......................... 10-2018-0029512

(51) Int. Cl.
| | |
|---|---|
| *G01H 3/12* | (2006.01) |
| *F02C 9/28* | (2006.01) |
| *F02C 9/22* | (2006.01) |
| *G01H 3/10* | (2006.01) |
| *F01D 21/14* | (2006.01) |

(Continued)

(52) U.S. Cl.
CPC ............. *G01H 3/12* (2013.01); *F01D 21/003* (2013.01); *F01D 21/14* (2013.01); *F02C 9/22* (2013.01); *F02C 9/28* (2013.01); *G01H 3/10* (2013.01); *G01H 11/06* (2013.01); *G01H 11/08* (2013.01); *F05D 2260/80* (2013.01); *F05D 2270/333* (2013.01); *F05D 2270/81* (2013.01)

(58) Field of Classification Search
CPC . G01H 3/12; G01H 3/10; G01H 11/06; G01H 11/08; F01D 21/003; F01D 21/14; F05D 2270/333; F05D 2270/81; F02C 9/28
USPC .......................................... 73/660, 659, 661
See application file for complete search history.

(56) References Cited

U.S. PATENT DOCUMENTS 3,245,219 A * 4/1966 Sieck .................. F04D 27/0261
60/39.281
5,576,480 A * 11/1996 Hopkins .............. B01D 65/102
73/38

(Continued)

FOREIGN PATENT DOCUMENTS

| EP | 3258067 A1 | 12/2017 |
|---|---|---|
| KR | 10-0667599 B1 | 1/2007 |

(Continued)

*Primary Examiner* — Lisa M Caputo
*Assistant Examiner* — Rose M Miller
(74) *Attorney, Agent, or Firm* — Harvest IP Law, LLP (57) ABSTRACT

An apparatus externally detects the presence of a fault or malfunction in a gas turbine using the sound of air passing through vanes. The apparatus includes a sound sensor configured to sense a sound; a signal converter configured to convert the sensed sound into a digital signal; a data processor configured to perform a sound quality evaluation by analyzing a sound quality of the digital signal; and a display configured to display a result of the sound quality evaluation. The gas turbine includes a compressor housed in a compressor casing in which an inlet guide vane (IGV) assembly and a variable guide vane (VGV) assembly are installed. The sound sensor includes a plurality of microphones are installed outside the compressor casing at positions adjacent to at least one of a vane of the IGV assembly and a vane of the VGV assembly.

5 Claims, 8 Drawing Sheets

(51) Int. Cl.
*F01D 21/00* (2006.01)
*G01H 11/06* (2006.01)
*G01H 11/08* (2006.01)

(56) References Cited

U.S. PATENT DOCUMENTS

| | | | | |
|---|---|---|---|---|
| 5,782,603 | A * | 7/1998 | O'Brien | F01D 17/08 |
| | | | | 415/1 |
| 9,045,999 | B2 | 6/2015 | Badami | |
| 2004/0011051 | A1 * | 1/2004 | Ryan | F02C 9/28 |
| | | | | 60/773 |
| 2009/0223218 | A1 * | 9/2009 | Winsor | F02B 39/16 |
| | | | | 60/600 |
| 2011/0079015 | A1 * | 4/2011 | Geis | F02C 7/05 |
| | | | | 60/779 |
| 2015/0135948 | A1 * | 5/2015 | Bryant | B01D 46/444 |
| | | | | 95/23 |

FOREIGN PATENT DOCUMENTS

| | | |
|---|---|---|
| KR | 10-2008-0025441 A | 3/2008 |
| KR | 10-2009-0010430 A | 1/2009 |
| KR | 10-1120620 B1 | 3/2012 |
| KR | 20160059039 A | 5/2016 |
| KR | 10-1691095 B1 | 12/2016 |

* cited by examiner

FAULT DETECTING APPARATUS, GAS TURBINE, AND METHOD OF DETECTING FAULT

CROSS-REFERENCE TO RELATED APPLICATIONS

This application claims priority to Korean Patent Application No. 10-2018-0029512, filed on Mar. 14, 2018, the disclosure of which is incorporated herein by reference in its entirety.

BACKGROUND OF THE DISCLOSURE

Field of the Disclosure

Exemplary embodiments of the present disclosure relate to an apparatus and method for detecting a fault using the sound of a flow of air passing through a vane.

Description of the Related Art

Generally, gas turbines include a compressor, a combustor, and a turbine. The compressor draws external air, compresses the air, and then transmits it to the combustor. Air compressed by the compressor enters a high-pressure and high-temperature state. The combustor mixes fuel with compressed air supplied from the compressor, and combusts the mixture. Combustion gas generated by the combustion is discharged to the turbine. Turbine blades provided in the turbine are rotated by the combustion gas, whereby power is generated. Generated power may be used for generating electricity, driving a mechanical device, etc.

The compressor is provided with an air inflow guide unit by which is controlled an air inflow rate through an inlet guide vane (IGV) assembly including a plurality of angle-adjustable vanes. The IGV assembly is an important component for providing starting stability and controlling compressor pulsation when the compressor starts or stops. A recently developed technology provides a variable guide vane (VGV) assembly, which is installed behind the IGV assembly, to improve the precision in controlling the air inflow rate and thereby enhance the efficiency of the turbine.

The conventional air inflow guide unit of the compressor may control air inflow by integrally adjusting the angles of the vanes of each of the IGV assembly and the VGV assembly using a separate vane control unit.

However, in the conventional gas turbine, the air inflow guide unit of the compressor is problematic in that, if any one of the plurality of vanes of the IGV assembly or the VGV assembly becomes immobile or malfunctions, the starting stability of the compressor is reduced, and it is difficult to precisely control the air inflow rate.

SUMMARY OF THE DISCLOSURE

An object of the present disclosure is to provide a fault detecting apparatus and method capable of externally detecting a fault in any one of a plurality of vanes of an IGV assembly or a VGV assembly.

Other objects and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

In accordance with one aspect of the present disclosure, there is provided an apparatus for detecting a fault in a gas turbine. The apparatus may include a sound sensor configured to sense a sound; a signal converter configured to convert the sensed sound into a digital signal; and a data processor configured to perform a sound quality evaluation by analyzing a sound quality of the digital signal.

The apparatus may further include a display configured to display a result of the sound quality evaluation.

The sound sensor may include a plurality of microphones.

The gas turbine may include a compressor housed in a compressor casing in which an inlet guide vane (IGV) assembly and a variable guide vane (VGV) assembly are installed, and the plurality of microphones may be installed outside the compressor casing at positions adjacent to at least one of a vane of the IGV assembly and a vane of the VGV assembly.

The signal converter may be further configured to output the digital signal by converting a sound of a flow of air sensed by the sound sensor, and the sensed airflow may include at least one of air passing over the vane of the IGV assembly and air passing over the vane of the VGV assembly.

The signal converter may include a first circuit configured to convert a sound into an audio signal, and a second circuit configured to convert the audio signal into the digital signal for data processing.

The data processor may be further configured to process data about a quality of the sound in the compressor that has been converted into the digital signal.

The data processor may be further configured to process the sound quality data by evaluating at least one sound component among a loudness of the sound, a sharpness of the sound, a roughness of the sound, and an octave of the sound.

The data processor may include a noise filter. The noise filter may include an amplifier configured to amplify the digital signal, a band-pass filter configured to pass frequencies within a certain band from the amplified signal, and a differential amplifier circuit configured to compensate for an error of a detection signal.

In accordance with another aspect of the present disclosure, there is provided a gas turbine including a compressor air configured to compress air; a combustor configured to produce combustion gas by mixing fuel with the compressed air and combusting the mixture; a turbine rotatable by the combustion gas; and a fault detecting apparatus installed in the compressor. The fault detecting apparatus may include a sound sensor configured to sense a sound of a flow of air passing through an interior of the compressor; a signal converter configured to convert the sensed sound into a digital signal, and a data processor configured to evaluate at least one sound component among a loudness of the sound, a sharpness of the sound, a roughness of the sound, and an octave of the sound.

The data processor may include a noise filter, and the noise filter may include an amplifier configured to amplify the digital signal, a band-pass filter configured to remove noise by passing frequencies within a certain band from the amplified signal, and a differential amplifier circuit configured to compensate for an error of a detection signal.

The fault detecting apparatus may further include a display configured to monitor a result of evaluation of the at least one sound component from which noise has been removed.

In accordance with another aspect of the present disclosure, there is provided a method of detecting a fault. The method may include sensing a sound of a target to be determined; converting the sensed sound into a digital signal; and analyzing sound components of the digital signal and determining whether the target is normal or abnormal. The analyzed sound components may include at least one of four sound components. These sound components may include a loudness of the sound, a sharpness of the sound, a roughness of the sound, and an octave of the sound.

The analyzing may include measuring each of the four sound components in a normal state, creating data from the measurements, and respectively comparing the analyzed sound components of the target with the created data of the four sound components.

The analyzing may include amplifying the digital signal, and removing noise by detecting frequencies within a certain band from the amplified digital signal The method may further include monitoring a result of evaluation of the four sound components.

As described above, an apparatus and method of detecting a fault in accordance with the present disclosure is advantageous in that a fault of any one of a plurality of vanes of an IGV assembly or a VGV assembly may be more rapidly and easily checked from the outside (externally) by collecting and analyzing the sound of air flowing through the vanes.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE EMBODIMENTS

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Figure 1:
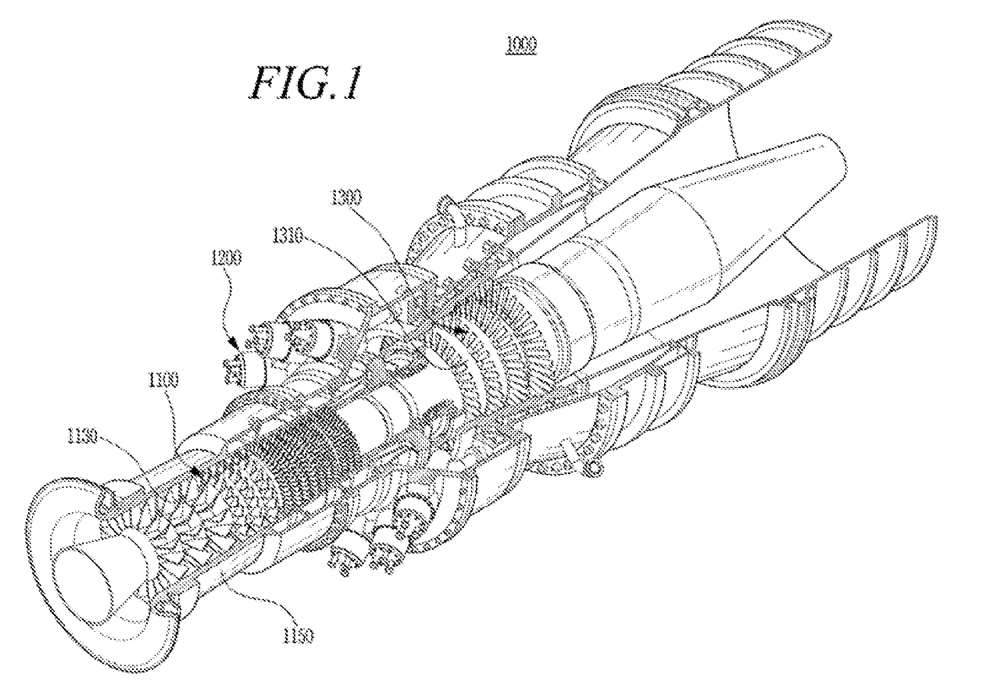
FIG. 1 is a cutaway perspective view of a gas turbine in which a fault detecting apparatus may be applied in accordance with the present disclosure.
Figure 2:
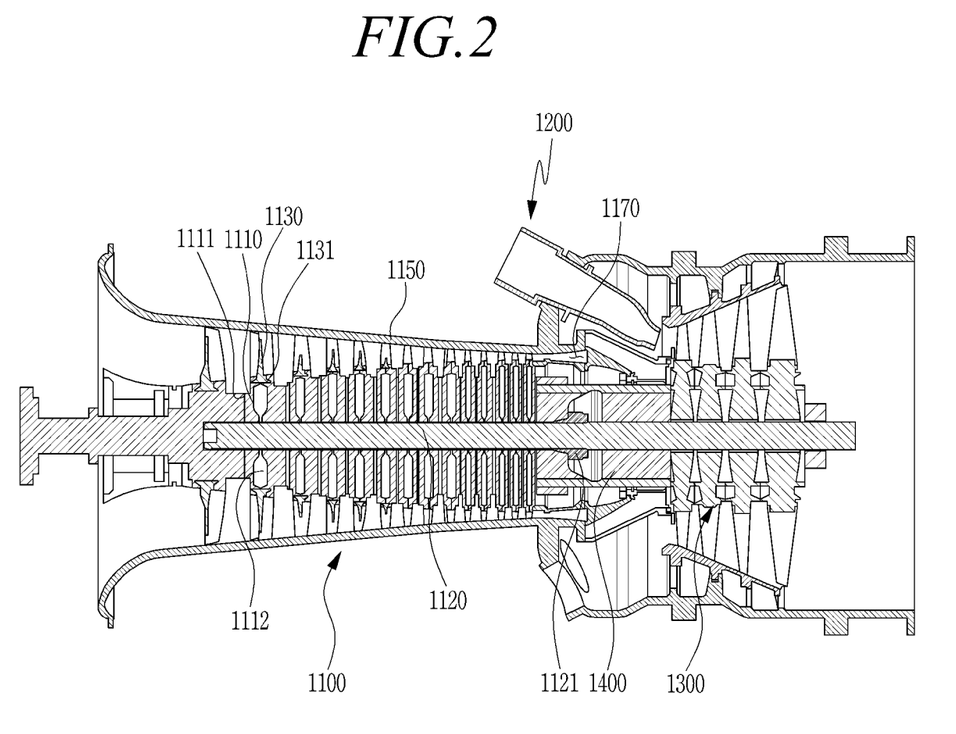
FIG. 2 is a cross section of the gas turbine of FIG. 1.
Figure 3:
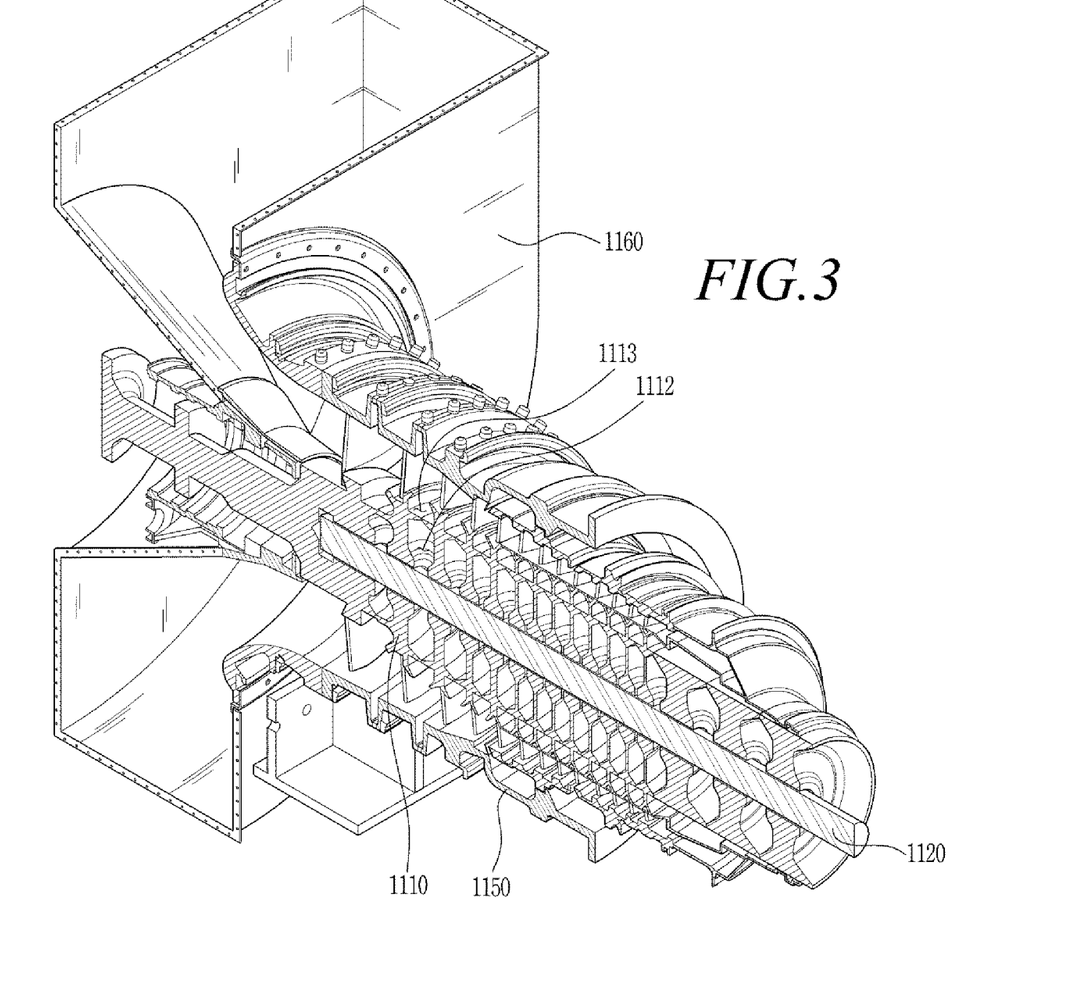
FIG. 3 is a cutaway perspective view of the compressor of the gas turbine of FIG. 1.

FIGS. 1 and 2 illustrate an internal structure of a gas turbine 1000 in accordance with an embodiment of the present disclosure, and FIG. 3 shows the compressor 1100 of the gas turbine.

As illustrated in FIGS. 1 to 3, the gas turbine 1000 may include a compressor 1100, a combustor 120, and a turbine 1300. The compressor 1100 may draw external air, and compress the air. The combustor 1200 may mix fuel with the air compressed by the compressor 1100, and combust the mixture. The turbine 1300 includes a plurality of turbine blades 1310, which are installed so as to be rotatable by combustion gas discharged from the combustor 1200. Hereinafter, the compressor 1100, which is a critical part of the present disclosure, will be described in detail, and detailed descriptions of the combustor 1200 and the turbine 1300 will be omitted.

The compressor 1100 among critical components of the gas turbine 1000 includes a plurality of rotor disks 1110, a center tie rod 1120, a plurality of blades 1130, a compressor casing 1150, an intake 1160, and a diffuser 1170.

The blades 1130 are mounted to each of the rotor disks 1110. The center tie rod 1120 is provided to pass through the rotor disk 1110. Each rotor disk 1110 may be rotated by rotation of the center tie rod 1120, thus rotating the blades 1130. The rotor disks 1110 may comprise fourteen such rotor disks arranged in a multistage structure.

The plurality of rotor disks 1110 are coupled by the center tie rod 1120 such that the rotor disks 1110 are not spaced apart from each other in an axial direction. The respective rotor disks 1110 through which the center tie rod 1120 passes are arranged along the axial direction. A plurality of protrusions (not illustrated) may be provided on an outer circumferential portion of each of the rotor disks 1110, and a flange 1111 may be provided on the outer circumferential portion so that the flange 1111 can be coupled with an adjacent rotor disk 1110 to allow the rotor disks 1110 to rotate together.

An air flow passage 1112 may be formed in any one or more of the plurality of rotor disks 1110. Air compressed by the blade 1130 of the compressor 1100 may move to the turbine 1300 through the air flow passage 1112, thus cooling the turbine blade 1310.

In an embodiment, a balancing member for weight balancing may be attached to the rotor disk 1110. The balancing member may be, for example, a weight. Since the balancing member is attached to the rotor disk 1110, the rotating stability of the rotor disk 1110 may be enhanced.

The center tie rod 1120 is disposed to pass through the rotor disks 1110 to align the rotor disks 1110. The center tie rod 1120 may receive torque generated from the turbine 1300 and rotate the rotor disk 1110. To this end, a torque tube 1400 functioning as a torque transmission member to transmit rotating torque generated from the turbine 1300 to the compressor 1100 may be disposed between the compressor 1100 and the turbine 1300.

One end of the center tie rod 1120 is coupled to the rotor disk that is disposed at the most upstream side, and the other end is inserted into and coupled to the torque tube 1400 using a compression nut 1121. The compression nut 1121 compresses the torque tube 1400 toward the rotor disks 1110 so that the respective rotor disks 1110 can come into close contact with each other.

The plurality of blades 1130 are radially coupled to an outer circumferential surface of each of the rotor disks 1110. Each blade 1130 may include a root member 1131 through which the blade 1130 is coupled to the rotor disk 1110. The rotor disk 1110 may include a slot 1113 into which the root member 1131 is inserted. In the present embodiment, the blades 1130 are coupled to the rotor disks 1110 in a slot manner, but the present disclosure is not limited to this coupling method. That is, various methods may be used to couple the blade 1130 and the rotor disk 1110.

The blades 1130 are rotated by the rotation of the rotor disk 1110 to compress drawn air and to move the compressed air to a subsequent stage. Air is compressed gradually to high pressures while passing through the blades 1130 successively forming the multi-stage structure.

The compressor casing 1150 forms the outer appearance of the compressor 1100 and houses the rotor disks 1110, the center tie rod 1120, the blades 1130, and so forth. The compressor casing 1150 may have a connection tube through which air compressed in a multi-stage manner by the multi-stage compressor blades 1130 flows to the turbine 1300 to cool the turbine blades.

The intake 1160 is disposed at an inlet of the compressor 1100. The intake 1160 draws external air into the compressor 1100. The diffuser 1170 for diffusing and moving compressed air is disposed on an outlet of the compressor 1100. The diffuser 1170 may rectify air compressed by the compressor 1100 before the compressed air is supplied to the combustor 1200, and may convert a portion of kinetic energy of the compressed air into static pressure energy. The compressed air that has passed through the diffuser 1170 is drawn into the combustor 1200.

The compressor 1100 may further include an air inflow guide unit 1180. The air inflow guide unit 1180 of the compressor 1100 will be described in more detail with reference to the drawings.

Figure 4:
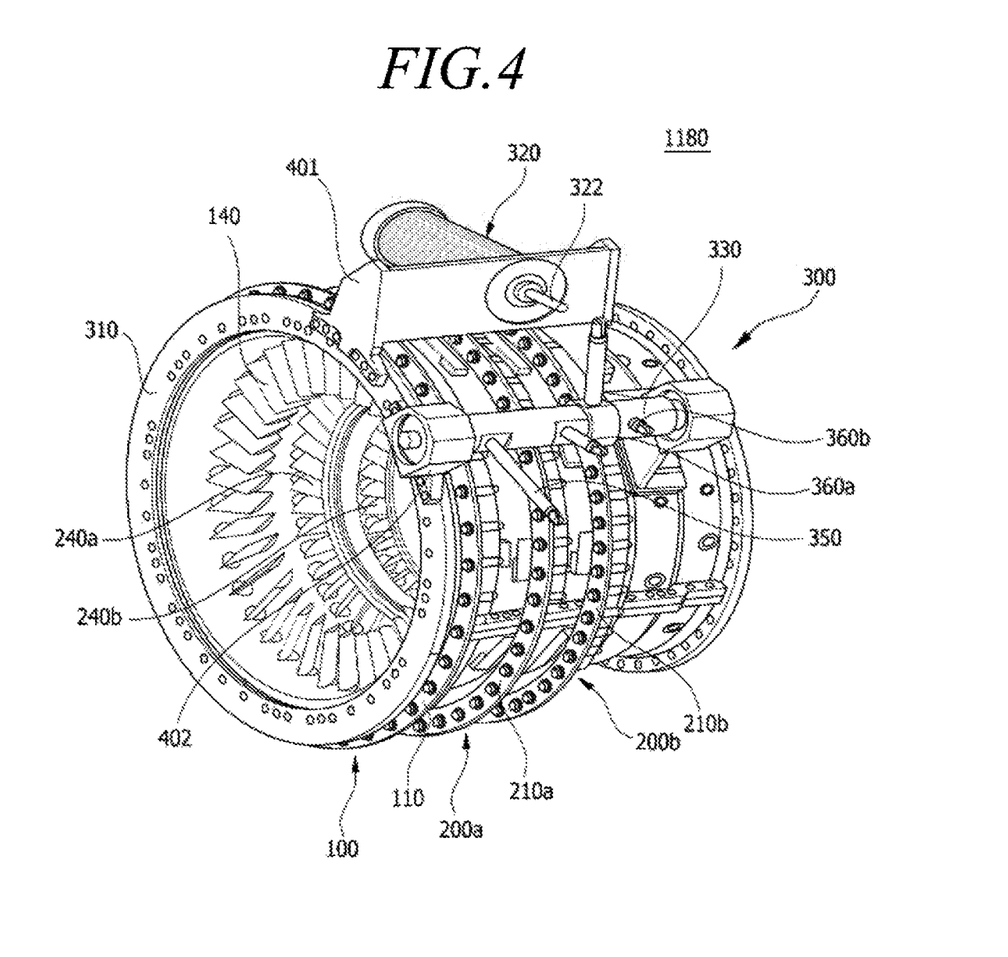
FIG. 4 is a perspective view of an air inflow guide unit of the compressor in accordance with an embodiment of the present disclosure.
Figure 5:
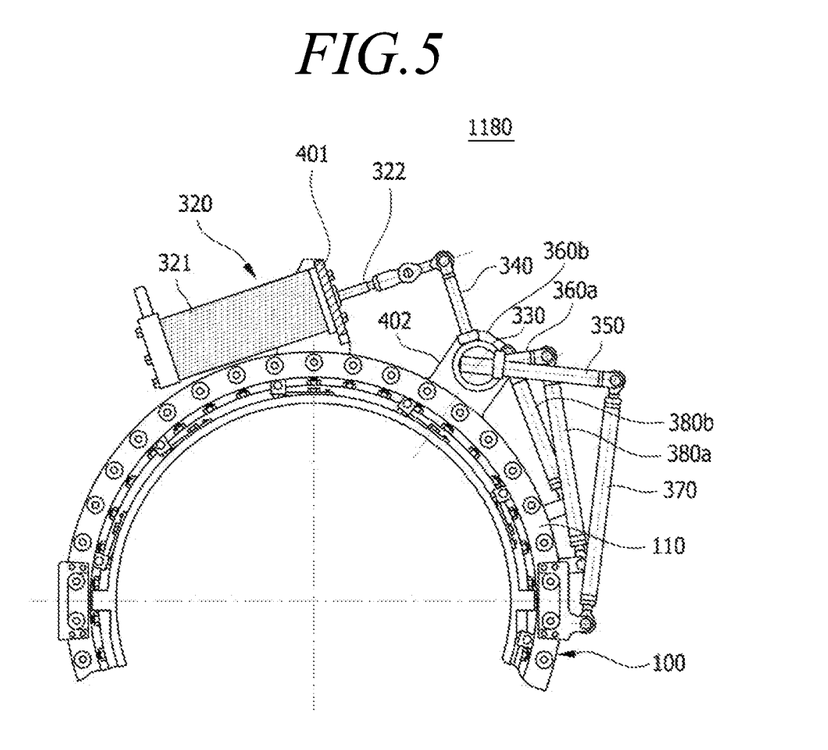
FIG. 5 is a front view of the air inflow guide unit of FIG. 4.
Figure 6:
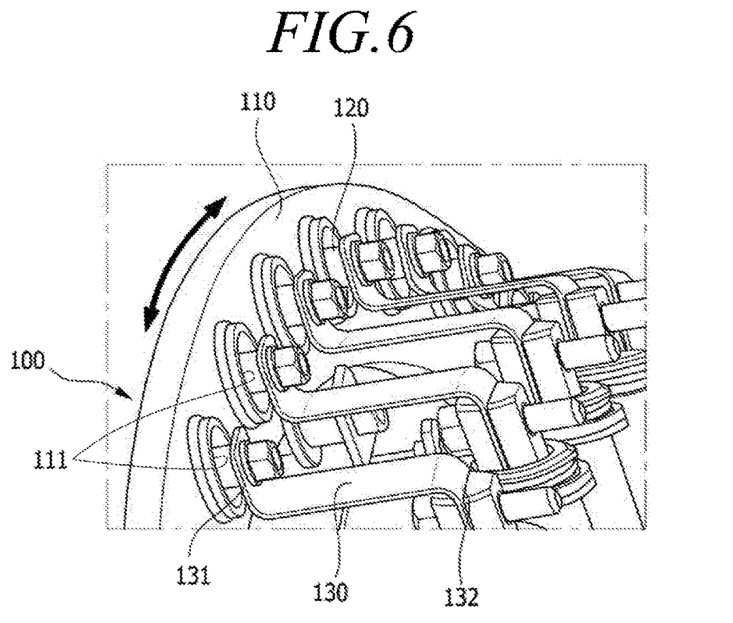
FIG. 6 is a perspective view of an inlet guide vane (IGV) assembly of the air inflow guide unit of FIG. 4.
Figure 7:
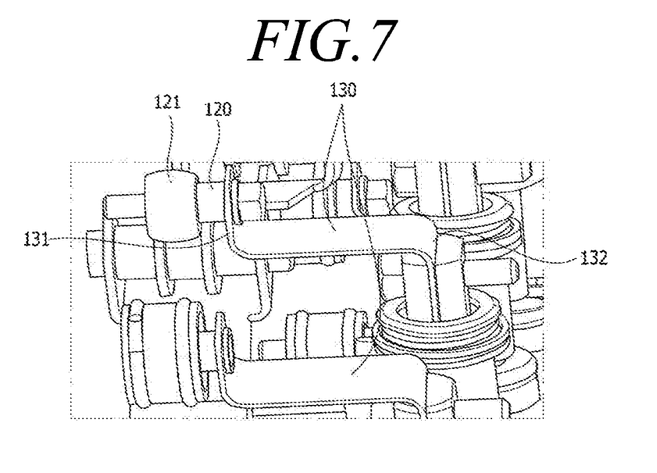
FIG. 7 is a perspective view of the IGV assembly of FIG. 6 from which a rotating ring has been removed.
Figure 8:
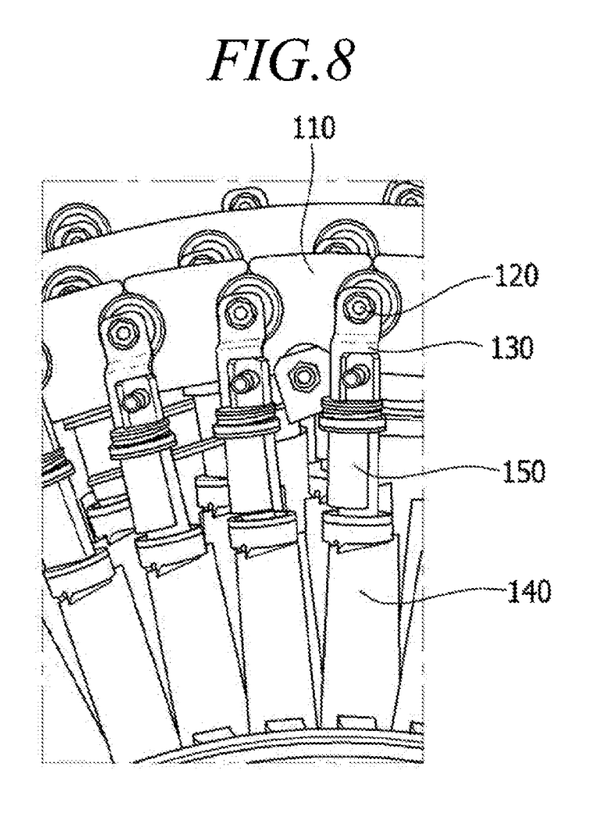
FIG. 8 is a perspective view of a rear side of the IGV assembly as shown in FIG. 6.

FIGS. 4 and 5 show an air inflow guide unit of the compressor in accordance with an embodiment of the present disclosure, and FIGS. 6 and 8 show an inlet guide vane (IGV) assembly of the air inflow guide unit. FIG. 7 shows the IGV assembly from which a rotating ring has been removed.

As illustrated in FIGS. 4 to 8, the air inflow guide unit 1180 may include an IGV assembly 100, variable guide vane (VGV) assemblies 200a and 200b, and a vane control unit 300.

The IGV assembly 100 includes a rotating ring 110, rotating ring connection shafts 120, connection links 130, and vanes 140. The rotating ring 110 is rotatably supported on a frame 310, is coupled with an IGV connection arm 350 to be described later herein, and has a plurality of connection holes 111 which are radially formed in a perimeter of a front surface of the rotating ring 110. Each of the rotating ring connection shafts 120 has, on its circumference, a rotating connection ball 121 which is inserted into a corresponding one of the connection holes 111 of the rotating ring 110. One end of each of the connection links 130 has an upward bend 131 which is connected to a rear end of a corresponding one of the rotating ring connection shafts 120. The vanes 140 are respectively connected to downward bends 132 of the connection links 130.

Each of the VGV assemblies 200a and 200b has the same configuration as that of the IGV assembly 100; therefore, detailed description thereof will be omitted.

The vane control unit 300 includes a frame 310, an actuator 320, a rotational operating shaft 330, an actuator connection arm 340, an IGV connection arm 350, VGV connection arms 360a and 360b, an IGV connection link 370, and VGV connection links 380a and 380b. The frame 310 is supported on the compressor casing 1150 so as to support the IGV assembly 100 and the VGV assemblies 200a and 200b. The actuator 320 includes a main body 321 which is fixed to the frame 310 through a mounting bracket 401, and an operating rod 322 which is installed in the main body 321 so as to retractably extend from the main body 321. The rotational operating shaft 330 is rotatably supported on the frame 310 through a support bracket 402. The actuator connection arm 340 is installed on a first side of a circumference of the rotational operating shaft 330 and is connected with the operating rod 322 of the actuator 320. The IGV connection arm 350 and the VGV connection arms 360a and 360b extend from a second side of the circumference of the rotational operating shaft 330. The IGV connection link 370 connects the IGV connection arm 350 with the IGV assembly 100. The VGV connection links 380a and 380b connect the VGV connection arms 360a and 360b with the VGV assemblies 200a and 200b.

The air inflow guide unit 1180 of the compressor 1100 having the above-mentioned configuration may simultaneously adjust, using the single actuator 320, respective rotating angles of the vanes 140 of the IGV assembly 100 and respective rotating angles of vanes 24a and 240b of the VGV assemblies 200a and 200b.

In other words, referring to FIG. 5, if the operating rod 322 of the actuator 320 is actuated so as to extend, the actuator connection arm 340 installed on the first side of the circumference of the rotational operating shaft 330 is rotated in a clockwise direction (with respect to the view of FIG. 5), so that the rotational operating shaft 330, the IGV connection arm 350, and the VGV connection arms 360a and 360b are also rotated in the clockwise direction. Thereby, the IGV connection link 370 and the VGV connection links 380a and 380b are moved downward to rotate the rotating ring 110 of the IGV assembly 100 and rotating rings 210a and 210b of the VGV assemblies 200a and 200b in the clockwise direction.

Here, when the rotating ring 110 of the IGV assembly 100 rotates in the clockwise direction, the rotating ring connection shafts 120 coupled to the rotating ring 110 through the rotating connection balls 121 are rotated to the right. Thereby, the connection links 130 and the vanes 140 are rotated to the right. Also, the rotating rings 210a and 210b of the VGV assemblies 200a and 200b are rotated in the clockwise direction simultaneously with the rotation of the rotating ring 110 of the IGV assembly 100. Consequently, the vanes 240*a* and 240*b* of the VGV assemblies 200*a* and 200*b* are also rotated to the right in the same manner as that of the vanes 140 of the IGV assemblies 100.

When the operating rod 322 of the actuator 320 that has been extended is retracted into the main body 321, the actuator connection arm 340 is rotated in a counterclockwise direction (with respect to the view of FIG. 5), so that the rotational operating shaft 330, the IGV connection arm 350, and the VGV connection arms 360*a* and 360*b* are rotated in the counterclockwise direction. Thereby, the IGV connection link 370 and the VGV connection links 380*a* and 380*b* are moved upward so that the rotating ring 110 of the IGV assembly 100 and the rotating rings 210*a* and 210*b* of the VGV assemblies 200*a* and 200*b* are rotated in the counterclockwise direction. Hence, the rotating ring 110 of the IGV assembly 100 and the rotating rings 210*a* and 210*b* of the VGV assemblies 200*a* and 200*b* are rotated in the counterclockwise direction. As a result, the vanes 140 of the IGV assembly 100 and the vanes 240*a* and 240*b* of the VGV assemblies 200*a* and 200*b* are rotated to the left.

As such, in the air inflow guide unit of the compressor of the gas turbine in accordance with the present disclosure, as the distance by which the operating rod 322 of the single actuator 320 extends is adjusted, the rotating angles of the vanes 140 of the IGV assembly 100 and the vanes 240*a* and 240*b* of the VGV assemblies 200*a* and 200*b* and a consequential air inflow rate of the compressor may be precisely adjusted.

The compressor 1100 may further include a fault detecting apparatus 1190. Hereinbelow, the fault detecting apparatus 1190 will be described with reference to FIG. 9.

Figure 9:
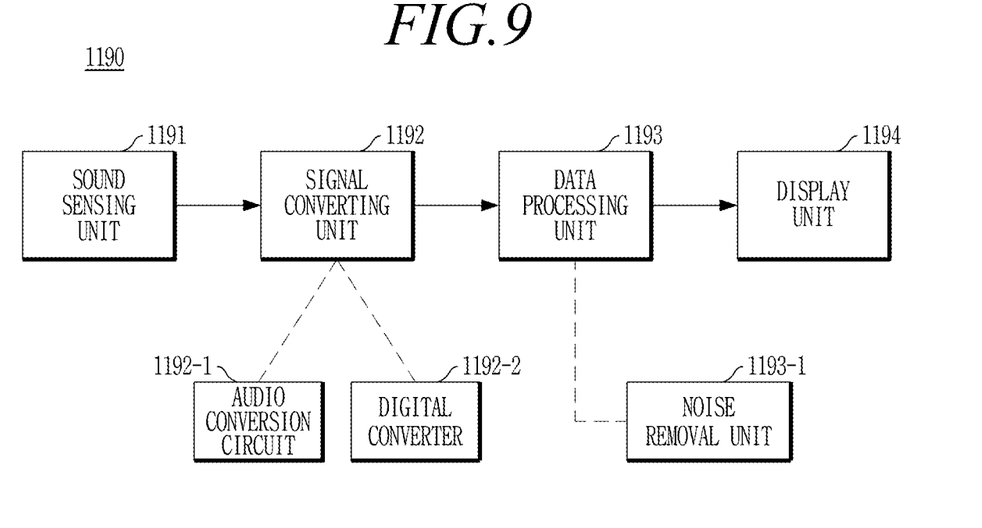
FIG. 9 is a block diagram illustrating an operating sound sensing device of the compressor in accordance with an embodiment of the present disclosure.

The fault detecting apparatus 1190 of the compressor includes a sound sensing unit 1191, a signal converting unit 1192, a data processing unit 1193, and a display unit 1194.

The sound sensing unit 1191 is provided to sense an internal sound of the compressor 1100 and may include, for example, a plurality of microphones. The plurality of microphones may be installed outside the compressor casing 1150 at positions adjacent to the vanes 140 of the IGV assembly 100 or the vanes 240*a* and 240*b* of the VGV assemblies 200*a* and 200*b* by a separate, external mounting device (not illustrated).

The signal converting unit 1192 may function to convert a sound of a flow of air sensed by the sound sensing unit 1191 into a digital signal. Here, the sensed airflow is the air flowing through (passing over) the vanes of the IGV assembly 100 and/or the air flowing through (passing over) the vanes of the VGV assemblies 200*a* and 200*b* in the compressor 1100. The signal converting unit 1192 may include a first circuit 1192-1 which converts a sound into an audio signal, and a second circuit 1192-2 which converts the audio signal into a digital signal for data processing. In addition, the signal converting unit 1192 may further include semiconductor devices and related circuitry needed to configure an overall circuit.

The data processing unit 1193 may process data about a quality of the internal sound of the compressor 1100 that has been converted into the digital signal by the signal converting unit 1192. That is, a sound quality of the digital signal is analyzed by the data processing unit 1193. The sound quality data processing operation of the data processing unit 1193 may be performed by evaluating at least one of sound quality components including a loudness of the sound, a sharpness of the sound, a roughness of the sound, and an octave of the sound. In other words, in the present disclosure, at least one of four kinds of sound quality components of the operating sound sensed by the sound sensing unit 1191 are evaluated. Thereby, in early stages, it is determined whether operation of any of the vanes 140 of the IGV assembly 100 and/or any of the vanes 240*a* and 240*b* of the VGV assemblies 200*a* and 200*b* is normal or abnormal. In other words, in the present disclosure, four kinds of sound quality components constituting quality components of a sound in a normal state (normal range) are previously measured and stored as data, and they are respectively compared with the data of the sound quality that has been sensed and processed, whereby it may be determined whether the vanes 140 of the IGV assembly 100 or the vanes 240*a* and 240*b* of the VGV assemblies 200*a* and 200*b* are operating normally or abnormally.

Figure 10:
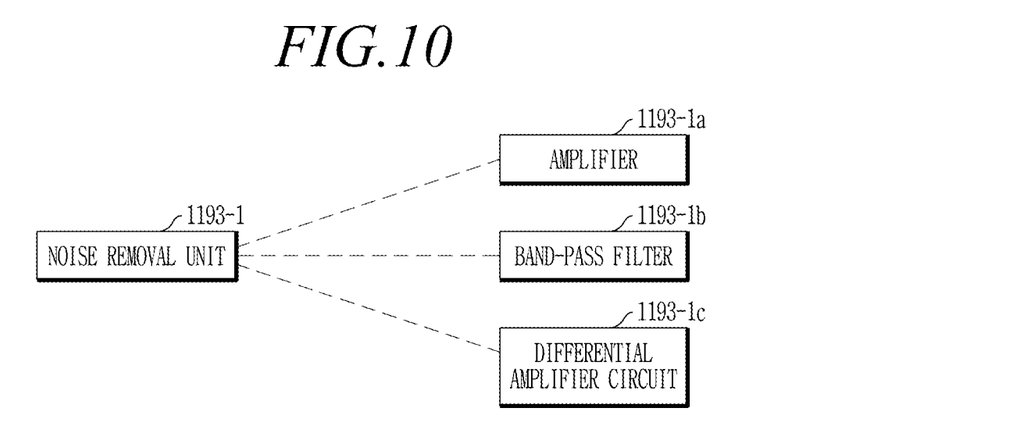
FIG. 10 is a detailed block diagram of a noise removal unit of FIG. 9.

To this end, the data processing unit 1193 of the present disclosure may include a noise removal unit 1193-1. Referring to FIG. 10, the noise removal unit 1193-1 may, as a noise filter, include an amplifier 1193-1*a* configured to amplify a digital signal, a band-pass filter 1193-1*b* configured to pass frequencies within a certain band from the amplified signal, and a differential amplifier circuit 1193-1*c* configured to compensate for an error of a detection signal.

In the noise removal unit 1193-1, after the amplifier 1193-1*a* amplifies a digital signal, frequencies within the certain band are detected from the amplified digital signal by the band-pass filter 1193-1*b*. Here, the passband of the noise removal unit 1193-1 filters out noise and passes the sound of the flow of air. The differential amplifier circuit 1193-1*c* may compensate, through differential amplification, for an error of the detected frequencies with respect to a certain frequency filtered from an audio signal received from another microphone of the sound sensing unit 1191 that is installed at a different position.

The display unit 1194 is provided to display the result of the evaluation of the data processing unit 1193, and may be a monitor. The display unit 1194 may display the result of the evaluation of the four kinds of sound quality components.

Thereby, a user may check with the naked eye whether the sound quality components, i.e., the loudness of the sound, the sharpness of the sound, the roughness of the sound, and the octave of the sound, displayed on the display unit 1194 are normal or abnormal. Consequently, the user may check whether the vanes 140 of the IGV assembly 100 or the vanes 240*a* and 240*b* of the VGV assemblies 200*a* and 200*b* are immobile, or whether the vanes 140 or 240*a* and 240*b* malfunction. If the result of the evaluation of the four kinds of sound quality components that has been checked with the naked eye indicates that the sound quality components are normal, the operation of the gas turbine remains constant. If the result indicates that the sound quality components are abnormal, the operation of the gas turbine is interrupted, and an operation of repairing the IGV assembly 100 or the VGV assemblies 200*a* and 200*b* that is in an abnormal state may be performed.

As described above, a fault detecting apparatus in accordance with the present disclosure is advantageous in that a fault of at least any one of a plurality of vanes of an IGV assembly or a VGV assembly may be more rapidly and easily detected from the outside by collecting and analyzing sounds of flows of air passing through the vanes.

While the present disclosure has been described with respect to the specific embodiments, it will be apparent to those skilled in the art that various changes and modifications may be made without departing from the scope of the disclosure as defined in the following claims.

What is claimed is:

1. An apparatus for detecting a fault in a gas turbine, the apparatus comprising:
a sound sensor including a plurality of microphones and configured to sense a sound in a compressor of the gas turbine;
a signal converter configured to convert the sound sensed by the sound sensor into a digital signal;
a data processor configured to evaluate a sound quality by analyzing a sound quality of the digital signal converted by the signal converter; and
a display configured to display a result of the sound quality evaluation,
wherein the gas turbine comprises the compressor housed in a compressor casing in which an inlet guide vane (IGV) assembly and a variable guide vane (VGV) assembly are installed, and wherein the plurality of microphones are installed outside the compressor casing at positions adjacent to at least one of a vane of the IGV assembly or a vane of the VGV assembly,
wherein the data processor evaluates the sound quality by analyzing at least one sound component among a loudness of the sound, a sharpness of the sound, a roughness of the sound, or an octave of the sound from an air flowing sound inside the compressor, and by comparing with a loudness of the sound, a sharpness of the sound, a roughness of the sound, or an octave of the sound measured in normal state, and
wherein the display displays an abnormal state or a normal state of the loudness of the sound, the sharpness of the sound, the roughness of the sound, or the octave of the sound to determine whether each vane of the IGV assembly or each vane of the VGV assembly does not move.

2. The apparatus according to claim 1, wherein the signal converter is further configured to output the digital signal by converting a sound of a flow of air sensed by the sound sensor, and wherein the sensed airflow includes at least one of air passing over the vane of the IGV assembly or air passing over the vane of the VGV assembly.

3. The apparatus according to claim 2, wherein the signal converting unit comprises an audio conversion circuit configured to convert a sound into an audio signal, and a digital converter configured to convert the audio signal into the digital signal for data processing.

4. The apparatus according to claim 1, wherein the data processor comprises a noise filter.

5. The apparatus according to claim 4, wherein the noise filter comprises an amplifier configured to amplify the digital signal, a band-pass filter configured to pass frequencies within a certain band from the amplified signal, and a differential amplifier circuit configured to compensate for an error of a detection signal.

* * * * *